Figure 1:
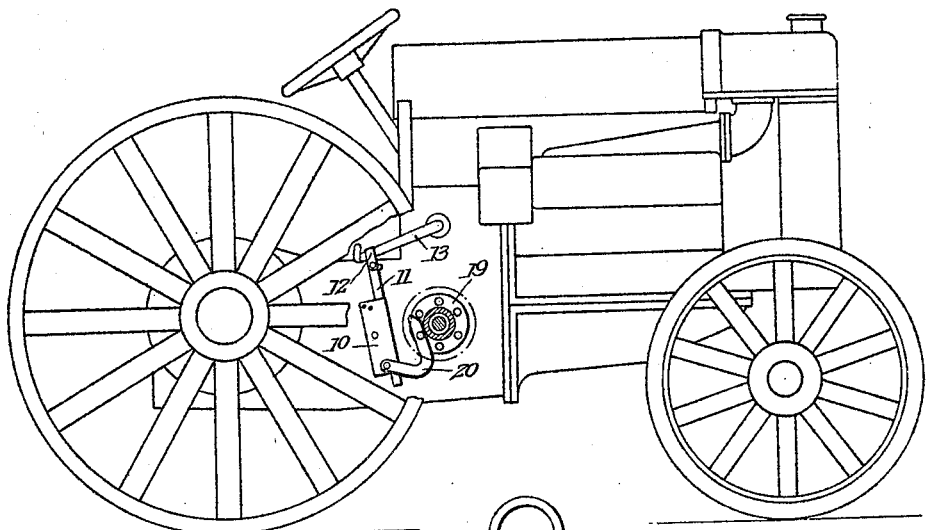

May 15, 1923.

O. G. STARK

CLUTCH CONTROL

Filed June 19, 1922

1,455,676

2 Sheets-Sheet 1

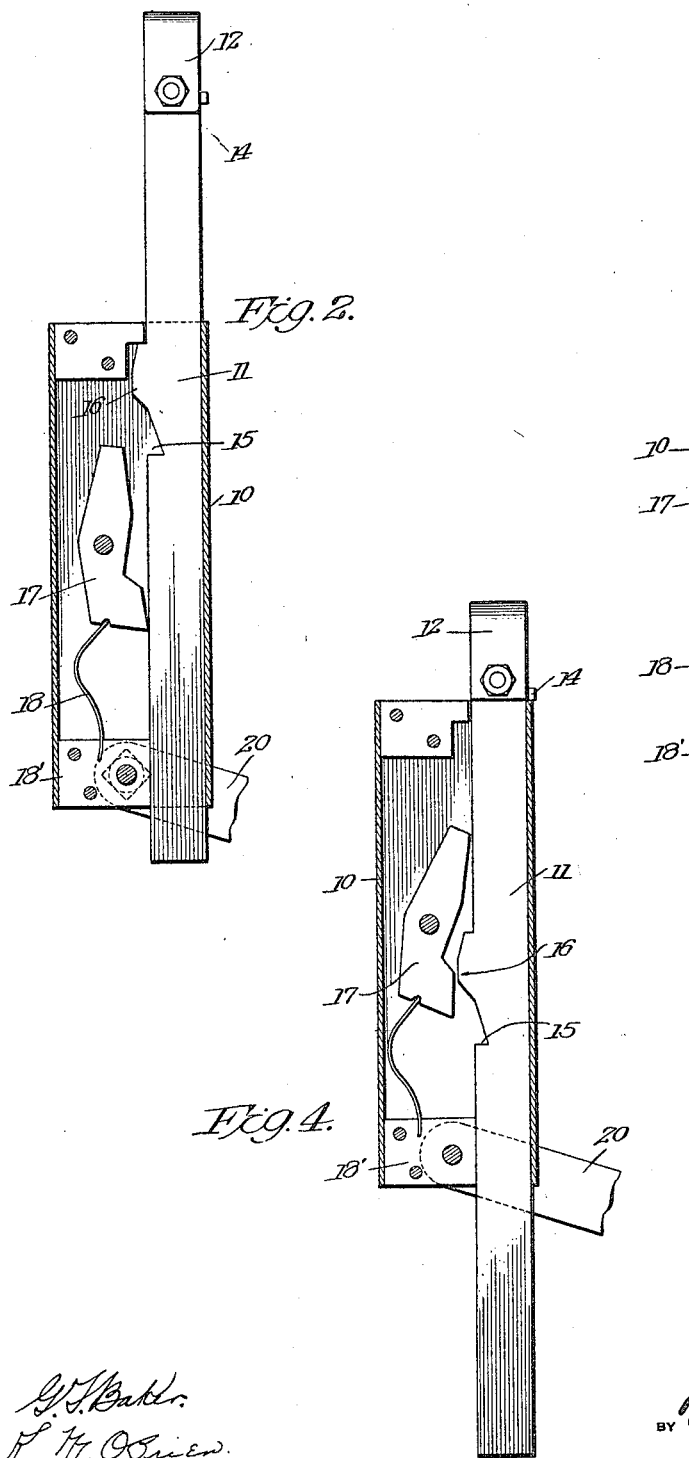

Patented May 15, 1923.

1,455,676

UNITED STATES PATENT OFFICE.

OLIN G. STARK, OF TUNKHANNOCK, PENNSYLVANIA.

CLUTCH CONTROL.

Application filed June 19, 1922. Serial No. 569,192.

*To all whom it may concern:*

Be it known that I, OLIN G. STARK, a citizen of the United States, residing at Tunkhannock, in the county of Wyoming and State of Pennsylvania, have invented new and useful Improvements in Clutch Controls, of which the following is a specification.

This invention relates to Fordson tractors, and has for its primary object, the provision of means for holding the clutch disengaged.

It is a well-known fact, that tractors of the above mentioned construction are frequently used for belt work, for which purpose a tractor is provided with a belt pulley, and that there is no means for stopping the belt pulley unless the clutch is held out by hand or foot. It also requires two operators for starting the engine for belt work, and when the tractor is to be stopped without stopping the engine, it is necessary for one man to hold the clutch disengaged.

It is therefore the purpose of this invention to provide a device designed for use with the clutch, and constructed to hold the clutch disengaged when the clutch arm or pedal is depressed a predetermined distance, the means for this purpose being automatically disengaged incident to a further depression of the clutch pedal.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a view, showing the manner of associating the device with the tractor.

Figure 2—is a longitudinal sectional view through the device showing the position of parts when the clutch is engaged.

Figure 3—is a similar view, showing the position of parts when the clutch is held disengaged.

Figure 4—is a view showing the position of parts when the clutch is released and about to return to normal position.

Figure 5:
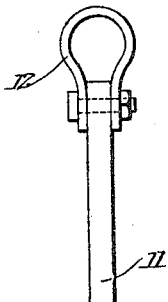

Figure 5—is a sectional view taken on line 5—5 of Figure 1.

The device forming the subject matter of the present invention comprises a casing or housing 10 which is of an elongated design, and through which housing slides a locking bar 11. This bar projects beyond both ends of the housing 10 and supports a clamp 12 which is designed to embrace the clutch operating arm 13. The locking bar is also provided with a stop 14 which is arranged to engage the adjacent end of the housing, and thus limit the movement of the bar in one direction. The bar 11 is provided at an appropriate point in its length with a notch 15, and directly at the rear of this notch, the bar is provided with an enlarged cam-like surface or portion 16, the purpose of which will be presently described. Pivoted within the housing directly above the bar is a pawl 17 which has one end connected with the adjacent end of a curved leaf spring 18, and the opposite end of this spring is suitably connected to a block or other suitable fixed support 18' arranged within the housing. The pawl is arranged to overlie the notch 15 and the cam-like portion 16, and alternately cooperates with these parts to either hold the locking bar in an active position, and incidentally hold the clutch disengaged, or to effect a release of the clutch. The device in its entirety is supported at one side of the machine upon the pulley flange 19 through the instrumentality of a bracket 20 which is substantially L-shaped. This bracket may be secured to the housing 10 and the pulley flange in any suitable manner.

In practice, when the clutch arm is depressed to disengage the clutch, the bar 11 is moved through the housing 10, and as illustrated in Figure 2, one end of the pawl normally bears against the adjacent end of the bar. Consequently, as the notch of the bar is brought directly beneath the adjacent end of the pawl, the latter is moved under the influence of its spring into the notch, and thereby holds the clutch disengaged without any effort on part of the operator.

When it is desired to release the clutch, further depression upon the clutch arm is all that is necessary, as any further movement of the bar 11 brings the cam-like portion 16 into use, and this cam-like portion operates to elevate the pawl, disengaging it from the bar 11. The pawl is positioned under these circumstances, so that the spring retains it in an elevated position to permit freedom of movement of the bar 11, but the opposite end of the pawl occupies a position directly at the rear of the cam-like portion 16. Consequently, when the clutch is released, it is moved to its normal position in the usual manner, and thereby reverses the direction of movement of the bar 11, and as the cam-like portion 16 is again brought into engagement with the pawl, it moves it about its pivot to return the pawl to its normal position. Manifestly, this does not take place until after the notch of the bar has moved beyond the forward end of the pawl, so that there is no possibility of the pawl interfering with the return of the clutch.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. An attachment for tractors, comprising a housing adapted to be supported adjacent the clutch control arm, a locking bar movable through the housing and terminally connected with said arm, a pawl pivoted within the housing and adapted to engage said bar to hold the latter in a position to maintain the clutch disengaged, a yieldable element associated with said pawl, and said bar being constructed to cooperate with the pawl to effect a release of itself incident to the movement of said arm as described.

2. An attachment for tractors comprising a housing supported by the tractor adjacent the clutch operating arm, a locking bar movable through the housing and having one end connected with said arm, whereby the bar is moved a predetermined distance incident to the depression of the arm to disengage the clutch, a spring pressed pivoted pawl operating within the housing and arranged to engage said bar to hold the clutch disengaged, and a cam-like portion formed on said bar and cooperating with said pawl, whereby said bar is released incident to a further depression on said clutch arm, to permit said clutch to return to normal position, and said cam-like portion further operating to return the pawl to normal position incident to the engagement of said clutch.

In testimony whereof I affix my signature.

OLIN G. STARK.